United States Patent
Hu (10) Patent No.: US 12,456,937 B2
(45) Date of Patent: Oct. 28, 2025

(54) FORCE CONTROL METHOD AND SYSTEM FOR MULTI-MOTOR SYNCHRONIZATION

(71) Applicant: Ningbo Gauss Robot Co., Ltd., Ningbo (CN)

(72) Inventor: Jingchen Hu, Shanghai (CN)

(73) Assignee: Ningbo Gauss Robot Co., Ltd., Ningbo (CN)

( * ) Notice: Subject to any disclaimer, the term of this patent is extended or adjusted under 35 U.S.C. 154(b) by 173 days.

(21) Appl. No.: 18/224,614

(22) Filed: Jul. 21, 2023

(65) Prior Publication Data

US 2024/0106358 A1 Mar. 28, 2024

(30) Foreign Application Priority Data

Sep. 15, 2022 (CN) .......................... 202211120651.5

(51) Int. Cl.
*H02P 5/48* (2016.01)

(52) U.S. Cl.
CPC ..................................... *H02P 5/48* (2013.01)

(58) Field of Classification Search
CPC ........................................................ H02P 5/48
USPC .......................................................... 318/85
See application file for complete search history.

(56) References Cited

U.S. PATENT DOCUMENTS

| 5,231,335 A | * | 7/1993 | Mega | ........................ | H02P 5/50 |
| | | | | | 706/900 |
| 6,771,036 B2 | * | 8/2004 | Fujita | ...................... | G05B 19/19 |
| | | | | | 318/575 |
| 2012/0083385 A1 | * | 4/2012 | Smith | ................... | B60W 20/00 |
| | | | | | 180/65.265 |

FOREIGN PATENT DOCUMENTS

| JP | 2003345442 A | * 12/2003 |
| JP | 2016149918 A | 8/2016 |
| WO | 2020048057 A1 | 3/2020 |

OTHER PUBLICATIONS

Congcong Du, et al., Design and Experimental Analysis of a Planar Compliant Parallel Manipulator, ICIRA, 2019, pp. 637-647.

* cited by examiner

*Primary Examiner* — Kawing Chan
(74) *Attorney, Agent, or Firm* — JCIPRNET (57) ABSTRACT

A force control method and system for multi-motor synchronization is provided. The force control method includes: acquiring a total desired force of a plurality of motors; calculating the desired force of each of the plurality of motors according to a characteristic of each of the plurality of motors; setting an external feedback loop for controlling each of the plurality of motors to operate according to the desired force, and taking a synchronization error of each of the plurality of motors as a feedback item of the external feedback loop; and setting an internal feedback loop for controlling each of the plurality of motors to operate according to the desired force, and taking an output force error of each of the plurality of motors as a feedback item of the internal feedback loop. The force control method and system ensures multi-motor synchronization under the premise of accurate force control.

19 Claims, 9 Drawing Sheets

FORCE CONTROL METHOD AND SYSTEM FOR MULTI-MOTOR SYNCHRONIZATION

CROSS REFERENCE TO THE RELATED APPLICATIONS

This application is based upon and claims priority to Chinese Patent Application No. 202211120651.5, filed on Sep. 15, 2022, the entire contents of which are incorporated herein by reference.

TECHNICAL FIELD

The present disclosure relates to the technical field of motor control, particularly to a force control method and system for multi-motor synchronization.

BACKGROUND

Many industrial scenarios require the synchronous operation of a plurality of motors. For example, for a mechanism that needs to output a large torque but its height is limited, if a single high-power motor cannot meet the requirement, multiple parallel motors can be used for synchronous operation.

The synchronous operation has high requirements for the synchronization of the motors. At present, most solutions consider only the position control mode of multi-motor synchronization, that is, to drive each of the plurality of motors to output the same desired motion trajectory. Control strategies include equal control, master-slave control, adjacent coupling control, cross-coupling control, virtual line-shaft control, deviation coupling control, etc. However, the multi-motor synchronization force control is required to be accurate and meet the displacement and velocity synchronization of each of the plurality of motors. It is equivalent to multi-motor hybrid force/position control, which is more difficult. In addition, the traditional solution of measuring the motor's output torque through current or a force sensor has limited application due to its high cost. Therefore, it is highly desired to develop a method that can ensure multi-motor synchronization while ensuring accurate force control.

SUMMARY

An objective of the present disclosure is to provide a force control method and system for multi-motor synchronization, which solves the problem that the existing multi-motor hybrid force/position control is difficult and costly.

The present disclosure provides the following technical solutions.

The present disclosure provides a force control method for multi-motor synchronization, including the following steps:
  acquiring the total desired force of a plurality of motors;
  calculating the desired force of each of the plurality of motors according to a characteristic of each of the plurality of motors;
  setting an external feedback loop for controlling each of the plurality of motors to operate according to the desired force, and taking a synchronization error of each of the plurality of motors as a feedback item of the external feedback loop; and
  setting an internal feedback loop for controlling each of the plurality of motors to operate according to the desired force, and taking an output force error of each of the plurality of motors as a feedback item of the internal feedback loop.

During the high-power force control output, the target total desired force of the plurality of motors and the characteristic of each of the plurality of motors are acquired, and the desired force of each of the plurality of motors is calculated. Meanwhile, when each of the plurality of motors is controlled to operate according to the corresponding desired force, the external feedback loop and the internal feedback loop are set. The synchronization error of each of the plurality of motors is taken as the feedback item of the external feedback loop, and the output force error of each of the plurality of motors is taken as the feedback item of the internal feedback loop. In this way, the present disclosure can realize accurate force control in a limited space, ensure multi-motor synchronization, and meet more industrial needs.

Specifically, the desired force curve of each of the plurality of motors is distributed according to the total desired force, and each of the plurality of motors is executed according to the desired force to achieve accurate control and maintain high synchronization of the displacement and velocity of each of the plurality of motors.

In addition, control is realized through two loops. The internal loop is a high-velocity force feedback loop. According to the output force error of the motor, the control rate is designed to make the motor output according to the corresponding desired force. The external loop is a low-velocity synchronization error loop. The control rate is designed according to the differences in displacement and velocity of each of the plurality of motors to further keep each of the plurality of motors operating synchronously.

In some implementations, taking a synchronization error of each of the plurality of motors as a feedback item of the external feedback loop specifically includes:
  measuring, by an encoder provided in each of the plurality of motors, the displacement and velocity of each of the plurality of motors in real-time;
  calculating the synchronization error of each of the plurality of motors according to the displacement and velocity of each of the plurality of motors; and
  taking the synchronization error as the feedback item of the external feedback loop.

When the synchronization error is calculated, the encoder provided in each of the plurality of motors is configured to measure the displacement and velocity of each of the plurality of motors in real-time, and the synchronization error of each of the plurality of motors is calculated by comparing the displacement and velocity of each of the plurality of motors.

In some implementations, the method further includes: presetting a control parameter of the external feedback loop, where
  the synchronization error includes a synchronization displacement error and a synchronization velocity error; and
  the control parameter of the external feedback loop includes a first parameter corresponding to the synchronization displacement error and a second parameter corresponding to the synchronization velocity error.

Specifically, the synchronization error includes the synchronization displacement error and the synchronization velocity error, which are configured to ensure the synchronization of displacement and velocity of each of the plurality of motors. During control, it is also necessary to preset the first parameter corresponding to synchronization displacement error and the second parameter corresponding to synchronization velocity error to adjust the motor output force. The first parameter and the second parameter can be adjusted according to the actual situation of the plurality of motors, which is not limited herein.

In some implementations, taking an output force error of each of the plurality of motors as a feedback item of the internal feedback loop specifically includes:
  acquiring an actual output force of each of the plurality of motors by measuring the deformation of a spring provided at a free end of each of the plurality of motors in real-time; and
  calculating the output force error of each of the plurality of motors according to the actual output force and the desired force of each of the plurality of motors, and taking the output force error as the feedback item of the internal feedback loop.

When the output force error is calculated, the deformation of the spring provided at the free end of each of the plurality of motors is measured in real-time to acquire the actual output force of each of the plurality of motors. The actual output force of each of the plurality of motors is compared with the desired force to acquire the output force error of each of the plurality of motors.

In addition, the spring is provided in series at the free end of a motor actuator for two purposes. First, the precise measurement of motor output force is realized by measuring the deformation of the spring. Second, the spring provided in series provides a certain redundancy of the synchronization error for the whole device to reduce mechanical stress and deformation and protect the equipment.

In some implementations, the method further includes:
  presetting a control parameter of the internal feedback loop.

In some implementations, the internal feedback loop is updated at a first preset frequency, and the external feedback loop is updated at a second preset frequency, and
  the first preset frequency is greater than the second preset frequency.

In some implementations, the internal feedback loop is provided with a first preset bandwidth, and the external feedback loop is provided with a second preset bandwidth;
  the first preset bandwidth is greater than the second preset bandwidth.

In addition, the present disclosure further provides a force control system for multi-motor synchronization based on the force control method for multi-motor synchronization and includes:
  a top plate, and
  a base plate provided opposite to the top plate, where a plurality of motors are fixedly provided on a side of the base plate facing the top plate,
  where an encoder is provided inside each of the plurality of motors and a free end of an actuator of each of the plurality of motors is connected to the top plate through a spring, and
  a displacement sensor is provided at a side of the spring to measure a deformation of the spring.

When the multi-motor synchronization force control method is specifically implemented, the top plate and the base plate are arranged. The top plate acts as a driving surface of the plurality of motors. The motors are fixed between the base plate and the top plate, and the encoder is provided inside each of the plurality of motors to measure the displacement and velocity of each of the plurality of motors in real-time. The free end of the actuator of the motor is connected to the top plate through the spring. The displacement sensor for measuring the deformation of the spring is provided at the side of the spring. The accurate measurement of motor output force is realized by measuring the deformation of the spring, and the spring can provide a certain redundancy of the synchronization error for the whole device to reduce the mechanical stress and deformation of the equipment.

In some implementations, four corners of the top plate are provided with guide holes, and four corners of the top surface of the base plate are provided with guide rods mated with the guide holes.

In some implementations, the plurality of motors are uniformly distributed and have the same model.

The force control method and system for multi-motor synchronization provided by the present disclosure have at least the following benefits:

(1) The target total desired force of the plurality of motors and the characteristic of each of the plurality of motors are acquired, and the desired force of each of the plurality of motors is calculated. Meanwhile, when each of the plurality of motors is controlled to operate according to the corresponding desired force, the external feedback loop and the internal feedback loop are set. The synchronization error of each of the plurality of motors is taken as the feedback item of the external feedback loop, and the output force error of each of the plurality of motors is taken as the feedback item of the internal feedback loop. In this way, the present disclosure can realize accurate force control in a limited space, ensure multi-motor synchronization, and meet more industrial needs.

(2) The spring is provided in series at the free end of a motor actuator for two purposes. First, the precise measurement of motor output force is realized by measuring the deformation of the spring. Second, the spring provided in series provides a certain redundancy of the synchronization error for the whole device to reduce mechanical stress and deformation and protect the equipment.

BRIEF DESCRIPTION OF THE DRAWINGS

Preferred implementations will be described below in a clear and easy-to-understand manner in conjunction with the drawings to further illustrate the above-mentioned characteristics, technical features, advantages, and implementation methods of the present disclosure.

Reference Numerals: 1. top plate; 2. base plate; 3. motor; 4. actuator; 5. spring; 6. displacement sensor; and 7. guide rod.

DETAILED DESCRIPTION OF THE EMBODIMENTS

To explain the embodiments of the present disclosure or the technical solutions in the prior art more clearly, the specific implementations of the present disclosure will be described below by referring to the drawings. The drawings in the following description show merely some embodiments of the present disclosure, and other drawings and other implementations may be derived from these drawings by those of ordinary skill in the art without creative efforts.

To keep the drawings concise, only components related to the present disclosure are schematically illustrated in each drawing, which does not represent its actual structure as a product. Further, for a better understanding, only one of the components having the same structure or function is schematically shown or marked in some drawings. Hereof, "one" not only means "only one", but also "more than one".

Figure 1:
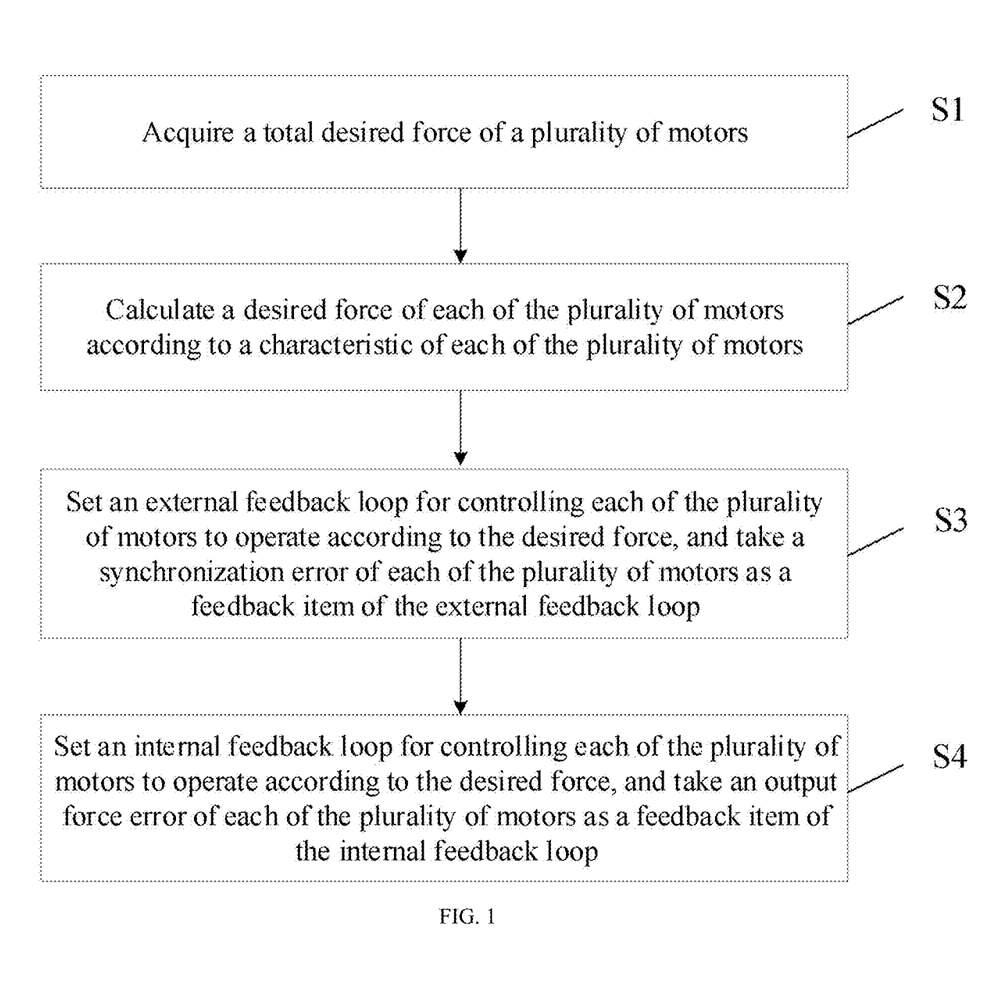
FIG. 1 is a flowchart of a method according to an embodiment of the present disclosure.
Figure 2:
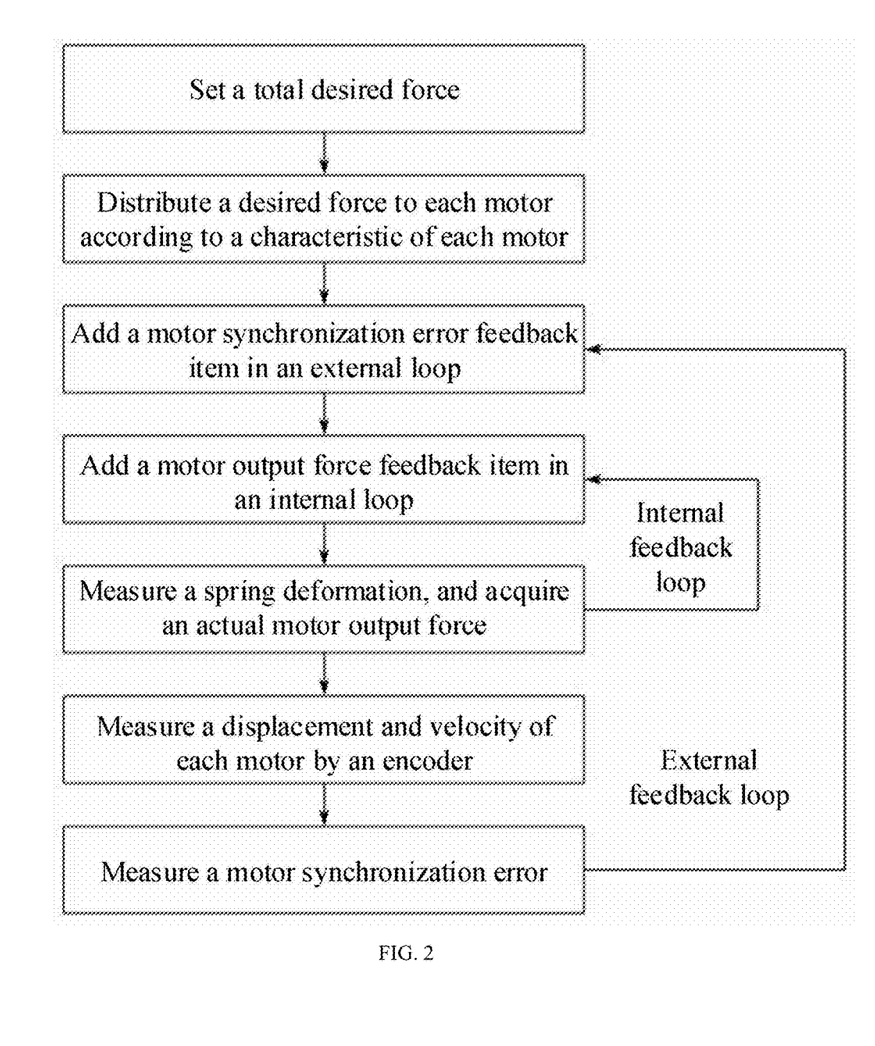
FIG. 2 shows the control logic according to an embodiment of the present disclosure.

The present disclosure provides a force control method for multi-motor synchronization. In an embodiment, referring to FIGS. 1 and 2, the force control method includes the following steps:

S1. A total desired force of a plurality of motors is acquired.

S2. A desired force of each of the plurality of motors is calculated according to a characteristic of each of the plurality of motors.

The total desired force $F_d$ is distributed to each of the plurality of motors according to a characteristic of each of the plurality of motors, and the desired force of each of the plurality of motors is $F_{di}$, where $$\sum_{i=1}^{N} F_{di} = F_d.$$

If the plurality of motors have the same model, the desired force shared by each of the plurality of motors should be close, so the desired force of each of the plurality of motors is set as $F_{di}=F_d/N$.

S3. An external feedback loop for controlling each of the plurality of motors to operate is set according to the desired force, and a synchronization error of each of the plurality of motors is taken as a feedback item of the external feedback loop.

Preferably, taking a synchronization error of each of the plurality of motors as a feedback item of the external feedback loop specifically includes:

The displacement and velocity of each of the plurality of motors are measured by an encoder provided in each of the plurality of motors in real-time.

The synchronization error of each of the plurality of motors is calculated according to the displacement and velocity of each of the plurality of motors.

The synchronization error is taken as the feedback item of the external feedback loop.

When the synchronization error is calculated, the encoder provided in each of the plurality of motors is configured to measure the displacement and velocity of each of the plurality of motors in real-time, and the synchronization error of each of the plurality of motors is calculated by comparing the displacement and velocity of each of the plurality of motors.

Preferably, the method further includes the step of a control parameter of the external feedback loop being preset.

The synchronization error includes a synchronization displacement error and a synchronization velocity error. The control parameter of the external feedback loop includes a first parameter corresponding to the synchronization displacement error and a second parameter corresponding to the synchronization velocity error.

Specifically, the synchronization error includes the synchronization displacement error and the synchronization velocity error, which are configured to ensure the synchronization of displacement and velocity of each of the plurality of motors. During control, it is also necessary to preset the first parameter corresponding to synchronization displacement error and the second parameter corresponding to synchronization velocity error to adjust the motor output force. The first parameter and the second parameter can be adjusted according to the actual situation of the plurality of motors, which is not limited herein.

Figure 3:
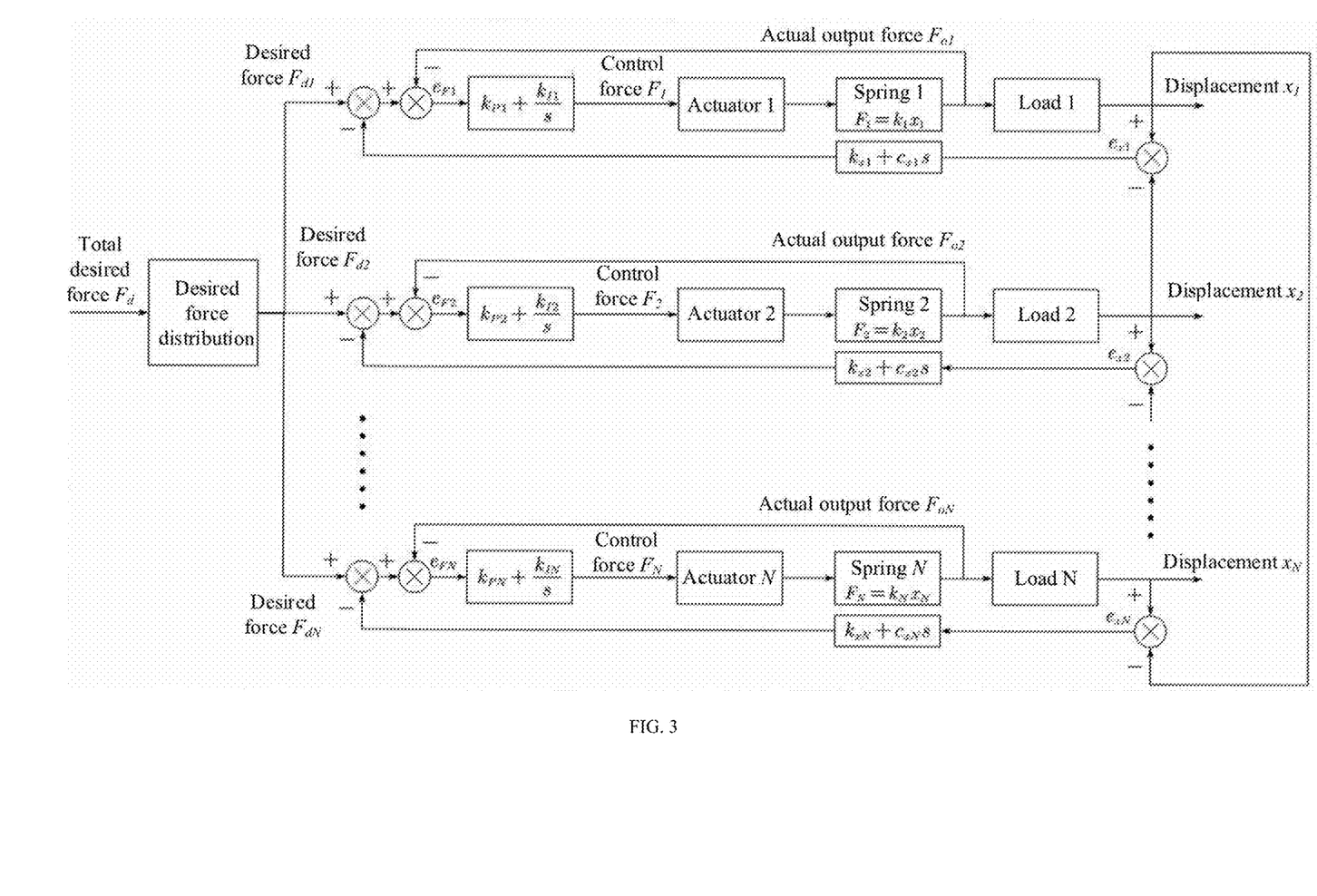
FIG. 3 shows an overall control loop according to an embodiment of the present disclosure.
Figure 4:
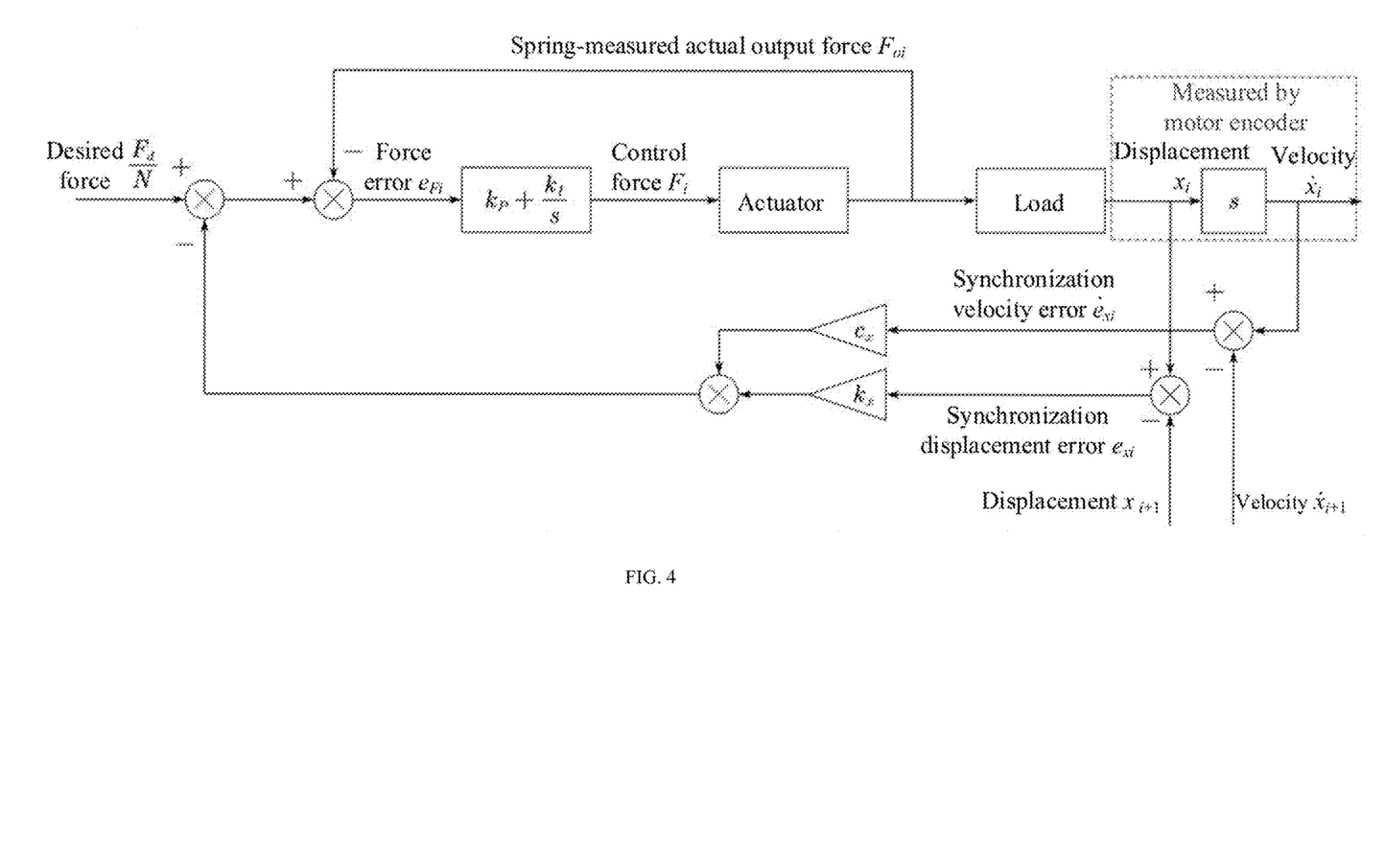
FIG. 4 shows a single-motor control loop according to an embodiment of the present disclosure.

As shown in FIGS. 3 and 4, considering the synchronization error of each of the plurality of motors, the synchronization error feedback loop is set as the external feedback loop. During the synchronous operation of the plurality of motors, the movement of each of the plurality of motors should be as synchronous as possible. If the synchronization error is too large, it will cause mechanical damage to the guide mechanism. To make each of the plurality of motors operate synchronously, the synchronization error feedback item added in the control loop of an i-th motor is $-k_{xi}e_{xi}-c_{xi}\dot{e}_{xi}$, where $k_{xi}$ and $c_{xi}$ denote the first and second parameters of the external feedback loop, respectively, and $e_{xi}$ and $\dot{e}_{xi}$ denote the synchronization displacement error and the synchronization velocity error, respectively, that is:

$$e_{xi} = \begin{cases} x_i - x_{i+1}, & i = 1, 2, \ldots, N-1 \\ x_N - x_1, & i = N \end{cases}$$

$$\dot{e}_{xi} = \begin{cases} \dot{x}_i - \dot{x}_{i+1}, & i = 1, 2, \ldots, N-1 \\ \dot{x}_N - \dot{x}_1, & i = N \end{cases}$$

where $x_i$ denotes the actual displacement of the i-th motor, and $\dot{x}_i$ denotes the actual velocity of the i-th motor.

S4. An internal feedback loop is set for controlling each of the plurality of motors to operate according to the desired force, and an output force error of each of the plurality of motors is taken as a feedback item of the internal feedback loop.

Preferably, taking an output force error of each of the plurality of motors as a feedback item of the internal feedback loop specifically includes:

An actual output force of each of the plurality of motors is acquired by measuring the deformation of a spring provided at a free end of each of the plurality of motors in real-time.

The output force error of each of the plurality of motors is calculated according to the actual output force and the desired force of each of the plurality of motors, and the output force error is taken as the feedback item of the internal feedback loop.

When the output force error is calculated, the deformation of the spring provided at the free end of each of the plurality of motors is measured in real-time to acquire the actual output force of each of the plurality of motors. The actual output force of each of the plurality of motors is compared with the desired force to acquire the output force error of each of the plurality of motors.

In addition, the spring is provided in series at the free end of a motor actuator for two purposes. First, the precise measurement of motor output force is realized by measuring the deformation of the spring. Second, the spring provided in series provides a certain redundancy of the synchronization error for the whole device to reduce mechanical stress and deformation and protect the equipment.

In an embodiment, the method further includes the step of a control parameter of the internal feedback loop being preset.

Considering the output force error of the motor, the force feedback loop is set as the internal feedback loop. The output force error feedback item added to the control loop of the i-th motor is $k_{Pi}e_{Fi}+k_{Ii}\int e_{Fi}dt$, where $k_{Pi}$ and $k_{Ii}$ are the control parameters of the internal feedback loop, and $e_{Fi}$ is an error between the actual output force and the control force of the motor.

The actual output force of each of the plurality of motors is acquired by measuring the deformation of the spring. It is assumed that the control force of the i-th motor is $F_i$, and the measured output force is $F_{oi}$. Generally, $F_{oi} < F_i$ due to friction and other losses of the actuator, and $F_{oi}$ is usually difficult to accurately measure. In this solution, the customized spring is added at the end of each of the plurality of motors (basically linear within the motor stroke). By measuring the deformation of the spring, accurate output force information $F_{oi}$ of the motor can be acquired and fed back to the internal feedback loop.

According to the above steps, the overall schematic diagram of the control loop can be derived, as shown in FIG. 3. The control equation of the i-th motor is: $F_i = k_{Pi}e_{Fi} + k_{Ii}\int e_{Fi}dt$, $e_{Fi} = (F_{di} - k_{xi}e_{xi} - c_{xi}\dot{e}_{xi}) - F_{oi}$, and the control loop of the i-th motor is shown in FIG. 4. The control equation of each of the plurality of motors includes three parts:

(1) Desired force $F_{di}$;
(2) External feedback loop and synchronization error feedback item $-k_{xi}e_{xi} - c_{xi}\dot{e}_{xi}$ of each of the plurality of motors;
(3) Internal feedback loop and motor output force error feedback item $k_{Pi}e_{Fi} + k_{Ii}\int e_{Fi}dt$.

During the high-power force control output, the target total desired force of the plurality of motors and the characteristic of each of the plurality of motors are acquired, and the desired force of each of the plurality of motors is calculated. Meanwhile, when each of the plurality of motors is controlled to operate according to the corresponding desired force, the external feedback loop and the internal feedback loop are set. The synchronization error of each of the plurality of motors is taken as the feedback item of the external feedback loop, and the output force error of each of the plurality of motors is taken as the feedback item of the internal feedback loop. In this way, the present disclosure can realize accurate force control in a limited space, ensure multi-motor synchronization, and meet more industrial needs.

Specifically, the desired force curve of each of the plurality of motors is distributed according to the total desired force, and each of the plurality of motors is executed according to the desired force to achieve accurate control and maintain high synchronization of the displacement and velocity of each of the plurality of motors.

In addition, control is realized through two loops. The internal loop is a high-velocity force feedback loop. According to the output force error of the motor, the control rate is designed to make the motor output according to the corresponding desired force. The external loop is a low-velocity synchronization error loop. The control rate is designed according to the differences in displacement and velocity of each of the plurality of motors to further keep each of the plurality of motors operating synchronously.

In an embodiment, the internal feedback loop is updated at a first preset frequency, and the external feedback loop is updated at a second preset frequency; the first preset frequency is greater than the second preset frequency.

In an embodiment, the internal feedback loop is provided with a first preset bandwidth, and the external feedback loop is provided with a second preset bandwidth; the first preset bandwidth is greater than the second preset bandwidth.

In addition, in order to prove the synchronization, stability and convergence of the force control method, it is assumed that the plurality of motors have the same model and load, and each control parameter is set to the same, that is, $k_{xi}=k_x$, $c_{xi}=c_x$, $k_{Pi}=k_P$, $k_{Ii}=k_I$, i=1, 2, ..., N. Therefore, the resultant force output by the N motors is:

$$F = \sum_{i=1}^{N} F_i = k_P(F_d - F_o) + k_I \int (F_d - F_o)dt$$

where $$F_o = \sum_{i=1}^{N} F_{oi}$$

is the actual output resultant force of the N motors, and fast and stable convergence can be achieved by adjusting the parameters $k_P$ and $k_I$.

Since each of the plurality of motors has the same model and load, the dynamic equation of the i-th motor is:

$$F_{oi} = m\ddot{x}_i + b\dot{x}_i + \tau$$

where m is the load mass (including the moment of inertia of the motor rotor), b is mainly viscous friction, and $\tau$ is mainly gravity and Coulomb friction.

After the correction of the internal loop, the actual output force error of the motor can quickly approach 0 (the control bandwidth of the internal feedback loop is generally more than 1 kHz or even tens of kHz), that is $$e_{Fi} = \left(\frac{F_d}{N} - k_x e_{xi} - c_x \dot{e}_{xi}\right) - F_{oi} \approx 0 \text{ so}$$

$$F_{oi} \approx \frac{F_d}{N} - k_x e_{xi} - c_x \dot{e}_{xi} \text{ and}$$

$$\frac{F_d}{N} - k_x e_{xi} - c_x \dot{e}_{xi} = m\ddot{x}_i + b\dot{x}_i + \tau$$

Subtracting the corresponding equation of the i-th motor from the corresponding equation of the (i+1)-motor yields:

$$-k_x e_{xi} + k_x e_{x(i+1)} - c_x \dot{e}_{xi} + c_x \dot{e}_{x(i+1)} = m\ddot{e}_{xi} + b\dot{e}_{xi}$$

The matrix form of N component equations is $$(mI)\ddot{e}_x + (bI+C)\dot{e}_x + Ke_x = 0, \text{ where}$$

$$C = \begin{bmatrix} c_x & -c_x & & & \\ & c_x & -c_x & & \\ & & \ddots & \ddots & \\ & & & c_x & -c_x \\ -c_x & & & & c_x \end{bmatrix}, K = \begin{bmatrix} k_x & -k_x & & & \\ & k_x & -k_x & & \\ & & \ddots & \ddots & \\ & & & k_x & -k_x \\ -k_x & & & & k_x \end{bmatrix}.$$

Writing the above equation in the form of state leads to $\dot{X}=AX$, where $$A = \begin{bmatrix} -\frac{1}{m}(bI+C) & -\frac{1}{m}K \\ I & 0 \end{bmatrix}, X = \begin{bmatrix} \dot{e}_x \\ e_x \end{bmatrix}.$$

That is, the control loop can converge stably on the premise that the matrix A has no eigenvalue with a positive real part. The eigenvalue equation of the matrix A can be rewritten as:

$$ms^2 + bs + h_i(c_x s + k_x) = 0, i=1,2,\ldots,N-1.$$

In this cluster of N unary quadratic complex coefficient equations (corresponding to 2N eigenvalues of the matrix), only the complex coefficients are variable, as follows:

$$h_i = 1 - e^{j\theta_i}, \quad \theta_i = 2\pi \frac{i}{N}.$$

The real part of the parameter $h_i$ is greater than or equal to 0. Appropriate parameters $k_x$ and $c_x$ are selected, such that the real parts of the solutions of this cluster of N unary quadratic complex coefficient equations are non-negative, that is, the matrix A has no eigenvalue with positive real parts, thus meeting the stability requirement of the control system.

In an embodiment, there are three motors with the same model operating synchronously. The actuators of the plurality of motors are consistent and have a transfer function of $K_m/(L_m s+1)$, where $K_m=0.95$, $L_m=0.01$; the load mass (including the moment of inertia of the motor rotor) is m=30 kg, the viscous friction is b=100N·s m, and the gravity and coulomb friction is τ=0.

The total desired force is $F_d=600 \sin(10\pi t)$, the internal loop control coefficient is $k_f=1000$, $k_P=10$, and the external loop control coefficient is $k_x=1500$, $c_x=200$.

Figure 5:
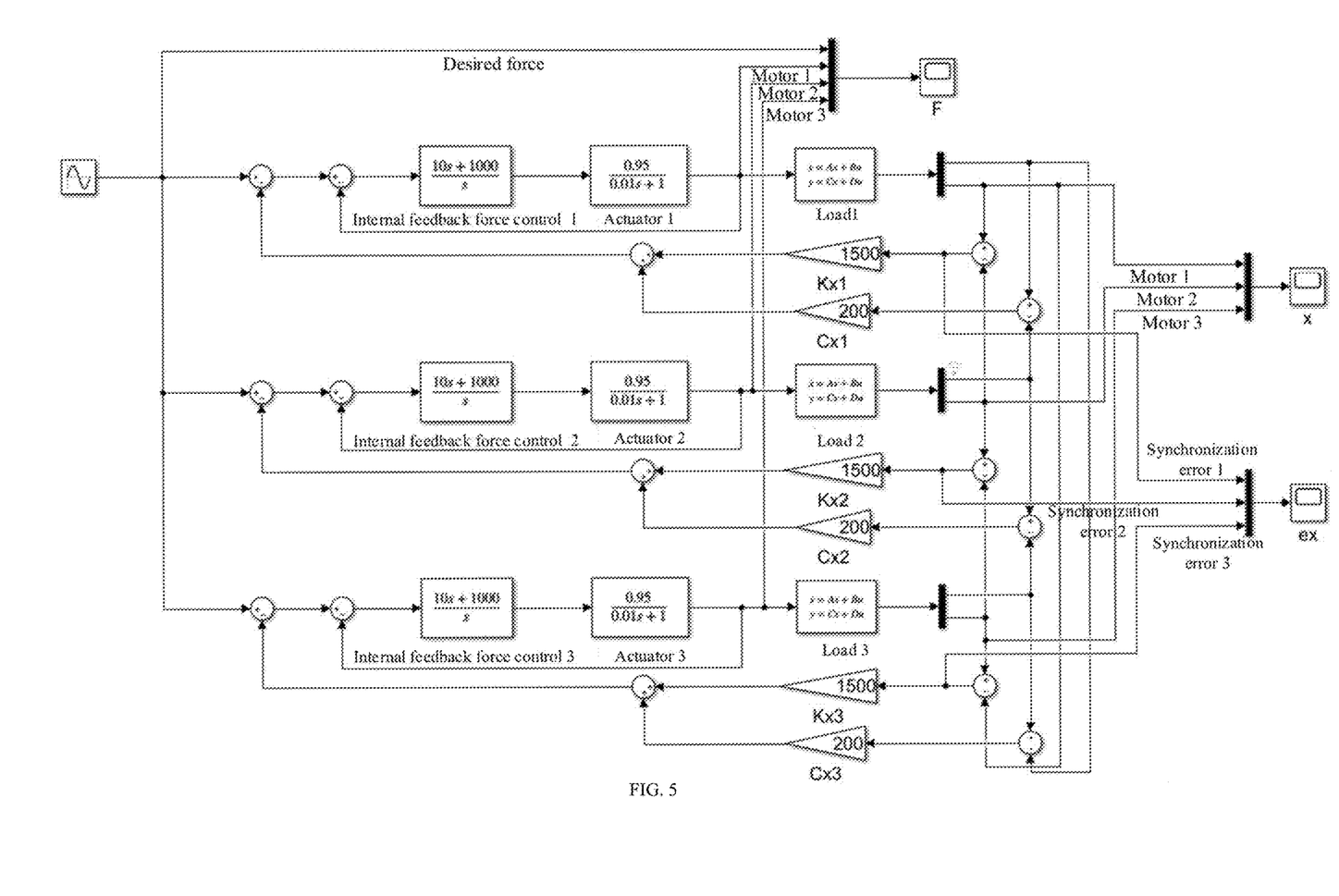
FIG. 5 shows a simulation model according to an embodiment of the present disclosure.
Figure 6:
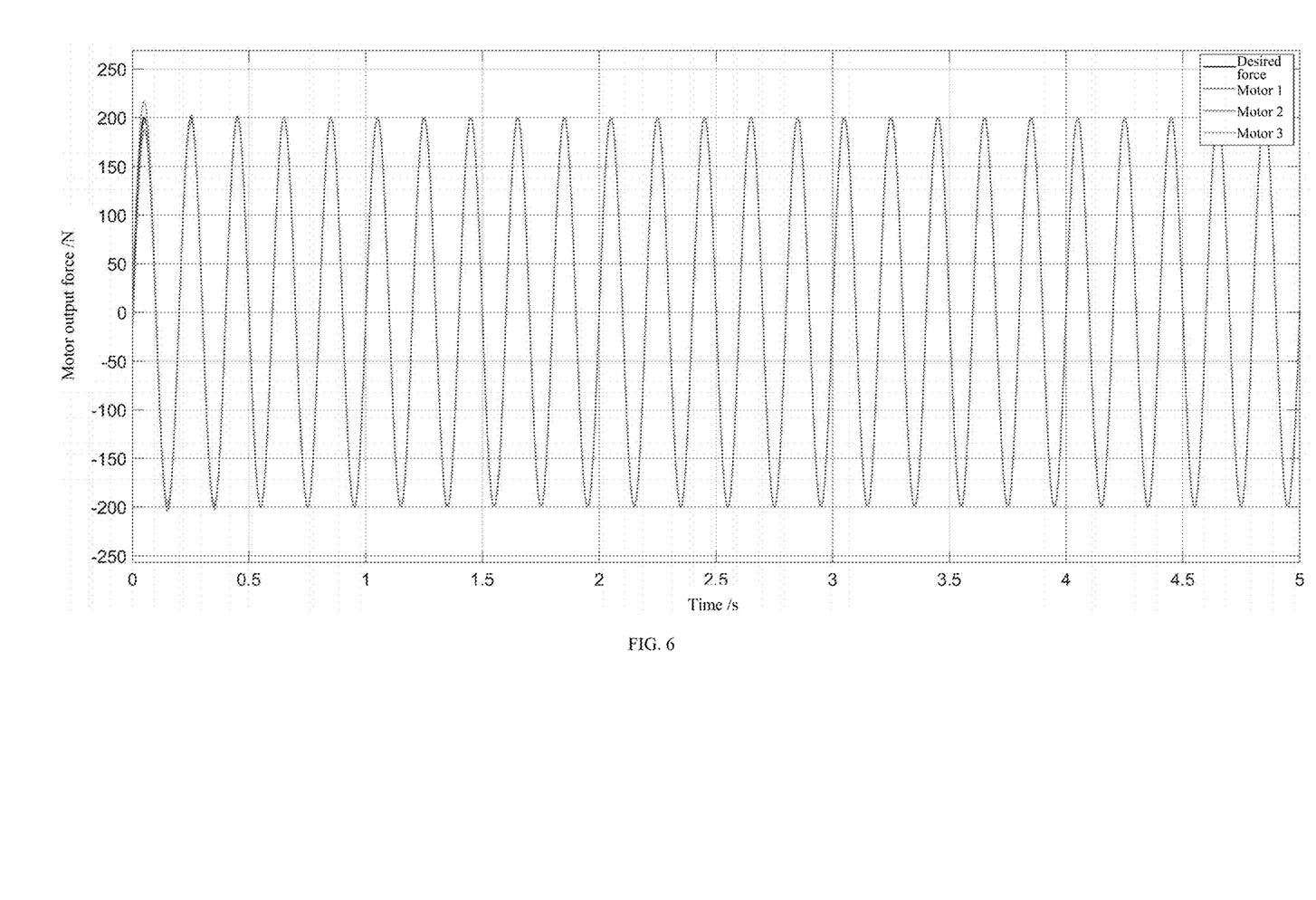
FIG. 6 shows an actual output force curve of each motor according to an embodiment of the present disclosure.
Figure 7:
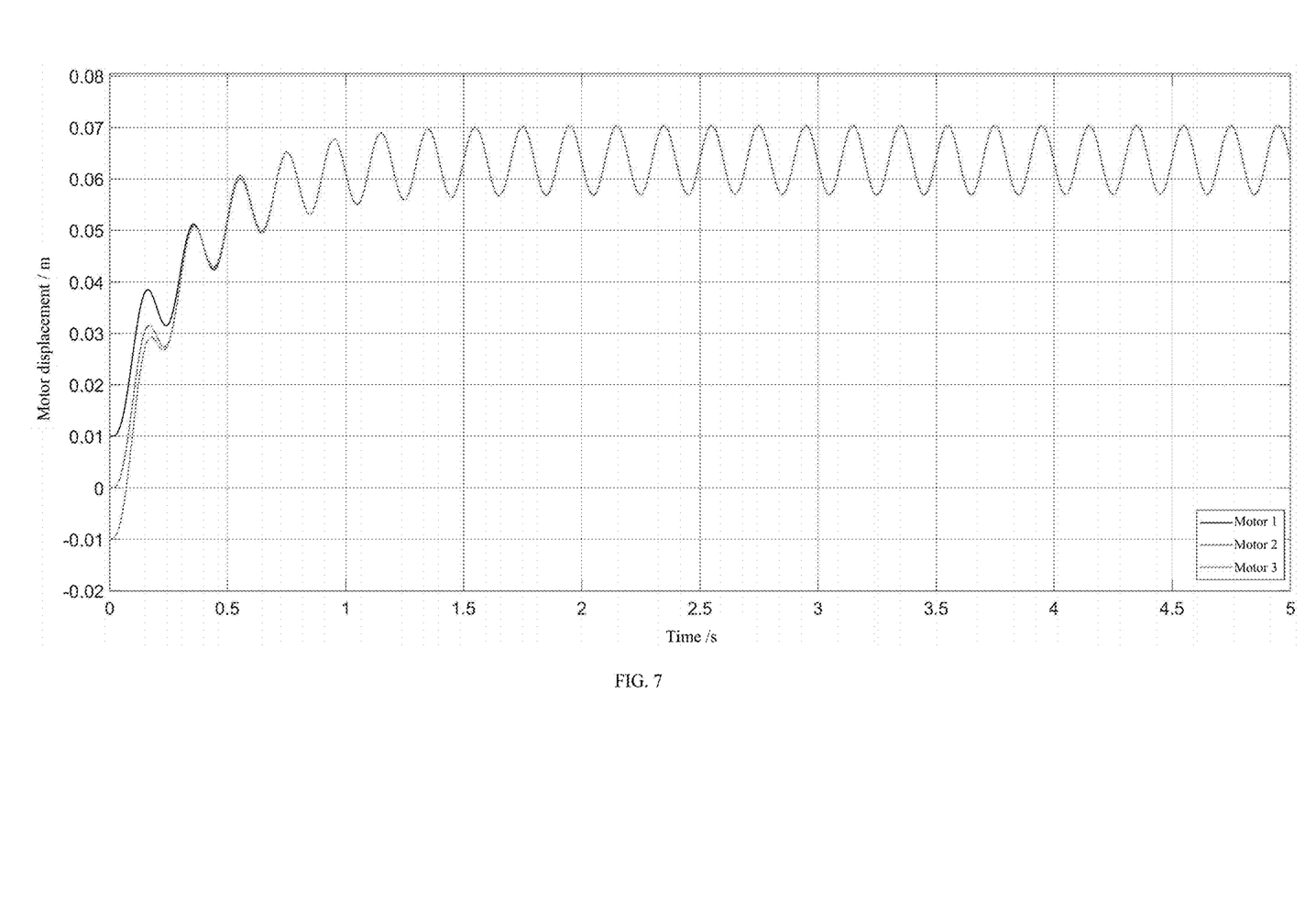
FIG. 7 shows a displacement curve of each motor according to an embodiment of the present disclosure.
Figure 8:
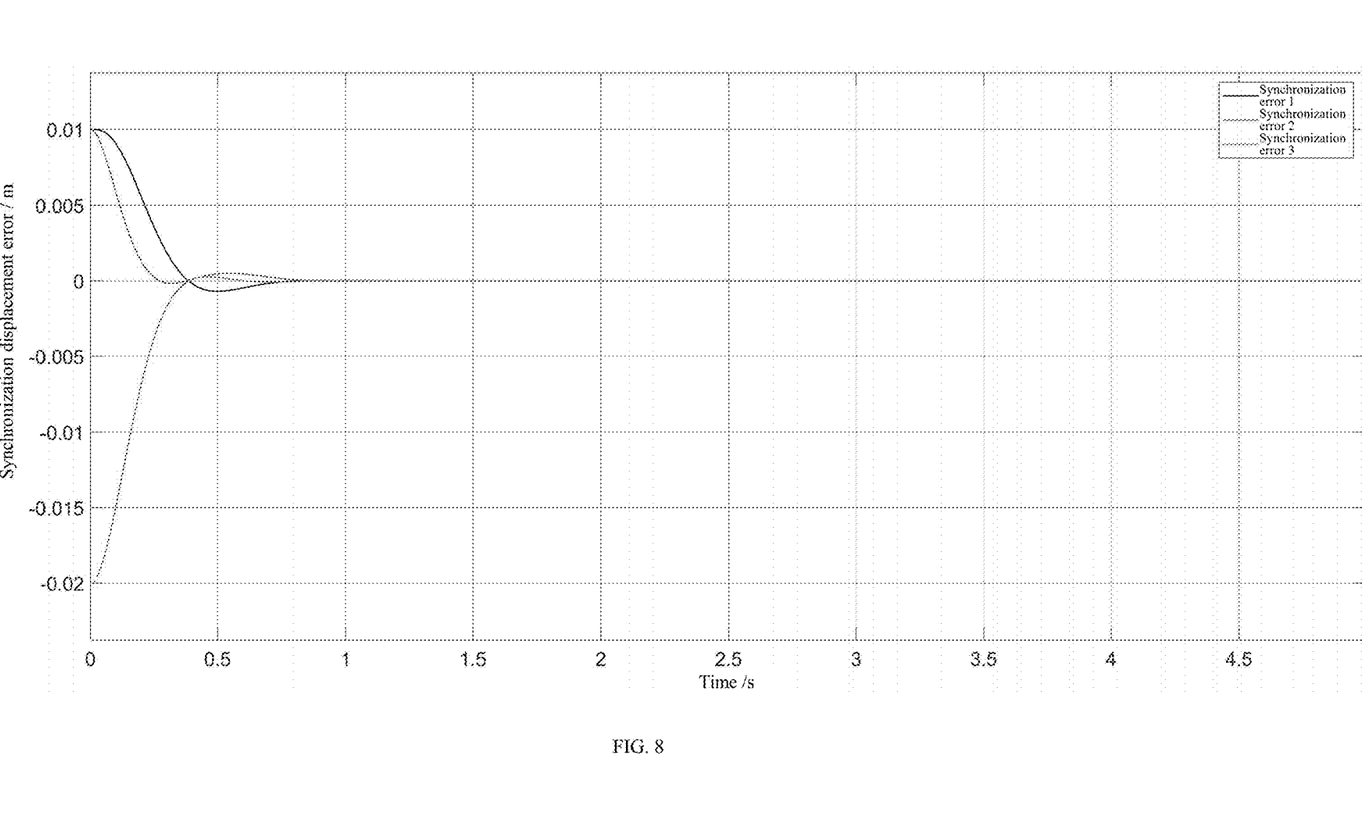
FIG. 8 shows a synchronization displacement error curve of each motor according to an embodiment of the present disclosure.

The initial positions and velocities of the plurality of motors are $\bar{x}_1=1$ cm, $\bar{x}_2=0$, $\bar{x}_3=-1$ cm, $\dot{\bar{x}}_1=\dot{\bar{x}}_2=\dot{\bar{x}}_3=0$. A simulation model is built in Simulink, as shown in FIG. 5. The actual output force curve of each of the plurality of motors is shown in FIG. 6. It can be seen that the actual output force curve of each of the plurality of motors is in good agreement with the desired force curve. The displacement curve of each of the plurality of motors is shown in FIG. 7, and the synchronization displacement error of each of the plurality of motors is shown in FIG. 8. Through this solution, after a short transition, the synchronization error of each of the plurality of motors can be quickly reduced to zero to achieve the purpose of synchronization force control. The simulation results show that the proposed force control device and method for multi-motor synchronization are feasible and efficient.

Figure 9:
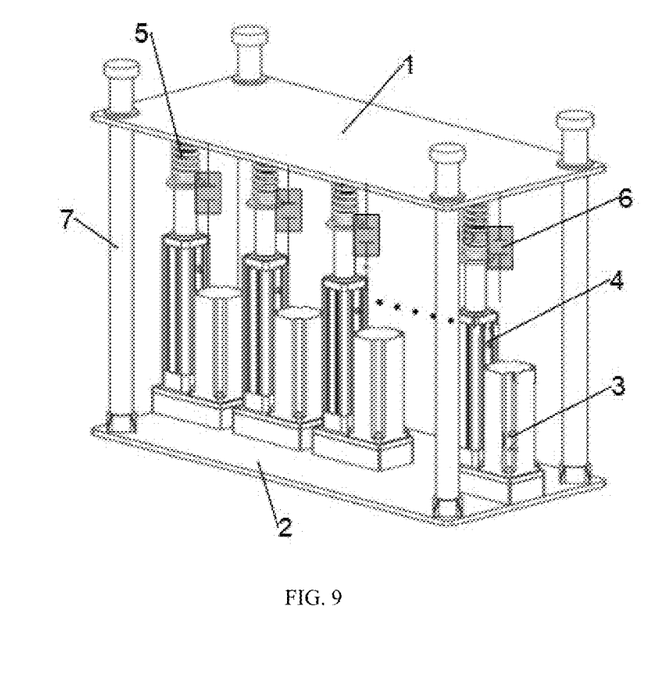
FIG. 9 is a structural diagram of a system according to an embodiment of the present disclosure.

In addition, the present disclosure further provides a force control system for multi-motor synchronization based on the force control method for multi-motor synchronization. Referring to FIG. 9, the force control system includes top plate 1 and base plate 2. The base plate 2 is opposite to the top plate 1, and a plurality of motors 3 are fixedly provided on a side of the base plate 2 facing the top plate 1.

In some implementations, the plurality of motors 3 are uniformly distributed and have the same model.

An encoder is provided inside each of the plurality of motors 3, and a free end of an actuator 4 of each of the plurality of motors 3 is connected to the top plate 1 through a spring 5. A displacement sensor 6 is provided at a side of the spring 5 to measure a deformation of the spring 5.

When the multi-motor synchronization force control method is specifically implemented, the top plate 1 and the base plate 2 are arranged. The top plate 1 acts as the driving surface of the plurality of motors. The motors 3 are fixed between the base plate 1 and the top plate 2, and the encoder is provided inside each of the plurality of motors 3 to measure the displacement and velocity of each of the plurality of motors in real-time. The free end of the actuator 4 of the motor 3 is connected to the top plate 1 through the spring 5. The displacement sensor 6 for measuring the deformation of the spring 5 is provided at the side of the spring 5. The accurate measurement of motor output force is realized by measuring the deformation of the spring 5, and the spring 5 can provide a certain redundancy of the synchronization error for the whole device to reduce the mechanical stress and deformation of the equipment.

In an embodiment, four corners of the top plate 1 are provided with guide holes, and four corners of the top surface of the base plate 2 are provided with guide rods 7 mated with the guide holes.

Through the guide holes and the guide rods 7, when the plurality of motors operate, the top plate 1 is moved along the guide rods 7 to prevent the top plate 1 from deviating.

It should be noted that the above embodiments can be freely combined as required. The above described are merely preferred implementations of the present disclosure. It should be noted that a person of ordinary skill in the art may further make several improvements and modifications without departing from the principle of the present disclosure, but such improvements and modifications should be deemed as falling within the protection scope of the present disclosure.

What is claimed is:

1. A force control method for multi-motor synchronization, comprising:
   acquiring a total desired force of a plurality of motors;
   calculating a desired force of each of the plurality of motors according to a characteristic of each of the plurality of motors;
   setting an external feedback loop for controlling each of the plurality of motors to operate according to the desired force, calculating a synchronization error of each of the plurality of motors according to a displacement and a velocity of each of the plurality of motors, and taking the synchronization error of each of the plurality of motors as a feedback item of the external feedback loop; and
   setting an internal feedback loop for controlling each of the plurality of motors to operate according to the desired force, and taking an output force error of each of the plurality of motors as a feedback item of the internal feedback loop.

2. The force control method for multi-motor synchronization according to claim 1, wherein
   measuring, by an encoder provided in each of the plurality of motors, the displacement and the velocity of each of the plurality of motors in real-time.

3. The force control method for multi-motor synchronization according to claim 2, further comprising: presetting a control parameter of the external feedback loop, wherein
the synchronization error comprises a synchronization displacement error and a synchronization velocity error; and
the control parameter of the external feedback loop comprises a first parameter corresponding to the synchronization displacement error and a second parameter corresponding to the synchronization velocity error.

4. The force control method for multi-motor synchronization according to claim 3, wherein the internal feedback loop is updated at a first preset frequency, and the external feedback loop is updated at a second preset frequency; and
the first preset frequency is greater than the second preset frequency.

5. The force control method for multi-motor synchronization according to claim 2, wherein the internal feedback loop is updated at a first preset frequency, and the external feedback loop is updated at a second preset frequency; and
the first preset frequency is greater than the second preset frequency.

6. The force control method for multi-motor synchronization according to claim 1, wherein the step of taking the output force error of each of the plurality of motors as the feedback item of the internal feedback loop comprises:
acquiring an actual output force of each of the plurality of motors by measuring a deformation of a spring provided at a free end of each of the plurality of motors in real-time; and
calculating the output force error of each of the plurality of motors according to the actual output force and the desired force of each of the plurality of motors, and taking the output force error as the feedback item of the internal feedback loop.

7. The force control method for multi-motor synchronization according to claim 6, wherein the internal feedback loop is updated at a first preset frequency, and the external feedback loop is updated at a second preset frequency; and
the first preset frequency is greater than the second preset frequency.

8. The force control method for multi-motor synchronization according to claim 1, further comprising: presetting a control parameter of the internal feedback loop.

9. The force control method for multi-motor synchronization according to claim 8, wherein a control rate of the internal feedback loop is updated at a first preset frequency, and a control rate of the external feedback loop is updated at a second preset frequency; and
the first preset frequency is greater than the second preset frequency.

10. The force control method for multi-motor synchronization according to claim 1, wherein a control rate of the internal feedback loop is updated at a first preset frequency, and a control rate of the external feedback loop is updated at a second preset frequency; and
the first preset frequency is greater than the second preset frequency.

11. A force control system for multi-motor synchronization based on the force control method for multi-motor synchronization according to claim 1, comprising:
a top plate, and
a base plate provided opposite to the top plate, wherein a plurality of motors are fixedly provided on a side of the base plate, wherein the side of the base plate faces the top plate;
wherein an encoder is provided inside each of the plurality of motors, and a free end of an actuator of each of the plurality of motors is connected to the top plate through a spring; and
a displacement sensor is provided at a side of the spring to measure a deformation of the spring.

12. The force control system for multi-motor synchronization according to claim 11, wherein four corners of the top plate are provided with guide holes, and four corners of a top surface of the base plate are provided with guide rods mated with the guide holes.

13. The force control system for multi-motor synchronization according to claim 11, wherein the plurality of motors are uniformly distributed and have a same model.

14. The force control system for multi-motor synchronization according to claim 11, wherein in the force control method for multi-motor synchronization, the step of taking the synchronization error of each of the plurality of motors as the feedback item of the external feedback loop comprises:
measuring, by an encoder provided in each of the plurality of motors, a displacement and a velocity of each of the plurality of motors in real-time;
calculating the synchronization error of each of the plurality of motors according to the displacement and the velocity of each of the plurality of motors; and
taking the synchronization error as the feedback item of the external feedback loop.

15. The force control system for multi-motor synchronization according to claim 14, wherein the force control method for multi-motor synchronization further comprises: presetting a control parameter of the external feedback loop, wherein
the synchronization error comprises a synchronization displacement error and a synchronization velocity error; and
the control parameter of the external feedback loop comprises a first parameter corresponding to the synchronization displacement error and a second parameter corresponding to the synchronization velocity error.

16. The force control system for multi-motor synchronization according to claim 11, wherein in the force control method for multi-motor synchronization, the step of taking the output force error of each of the plurality of motors as the feedback item of the internal feedback loop comprises:
acquiring an actual output force of each of the plurality of motors by measuring a deformation of the spring provided at a free end of each of the plurality of motors in real-time; and
calculating the output force error of each of the plurality of motors according to the actual output force and the desired force of each of the plurality of motors, and taking the output force error as the feedback item of the internal feedback loop.

17. The force control system for multi-motor synchronization according to claim 11, wherein the force control method for multi-motor synchronization further comprises: presetting a control parameter of the internal feedback loop.

18. The force control system for multi-motor synchronization according to claim 11, wherein in the force control method for multi-motor synchronization, the internal feedback loop is updated at a first preset frequency, and the external feedback loop is updated at a second preset frequency; and
the first preset frequency is greater than the second preset frequency.

19. The force control system for multi-motor synchronization according to claim 18, wherein in the force control method for multi-motor synchronization, the internal feedback loop is provided with a first preset bandwidth, and the external feedback loop is provided with a second preset bandwidth; and the first preset bandwidth is greater than the second preset bandwidth.

* * * * *